United States Patent
Si et al.

(10) Patent No.: US 8,804,928 B2
(45) Date of Patent: Aug. 12, 2014

(54) SYSTEM AND METHOD FOR ALLOWING VIRTUAL PRIVATE NETWORK USERS TO OBTAIN PRESENCE STATUS AND/OR LOCATION OF OTHERS ON DEMAND

(71) Applicant: Oracle International Corporation, Redwood Shores, CA (US)

(72) Inventors: Xiaohong Si, Beijing (CN); Tao Cui, Beijing (CN); Qingshan Wang, Beijing (CN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/655,717

(22) Filed: Oct. 19, 2012

(65) Prior Publication Data
US 2014/0112462 A1    Apr. 24, 2014

(51) Int. Cl.
*H04M 11/00* (2006.01)
*H04M 3/42* (2006.01)
*H04M 1/00* (2006.01)

(52) U.S. Cl.
USPC ............ 379/93.23; 379/201.1; 379/352; 379/901; 455/457; 455/461; 455/566

(58) Field of Classification Search
USPC ........... 379/93.17, 93.23, 400.05, 100.06, 379/102.07, 265.03, 265.04, 265.06, 901; 455/404.2, 412.2, 415, 433, 457, 461, 455/566
See application file for complete search history.

(56) References Cited

U.S. PATENT DOCUMENTS

| | | | | |
|---|---|---|---|---|
| 5,422,941 | A * | 6/1995 | Hasenauer et al. | 379/246 |
| 7,227,937 | B1 * | 6/2007 | Yoakum et al. | 379/201.01 |
| 8,467,514 | B1 * | 6/2013 | Makhmudov et al. | 379/201.1 |
| 2004/0037396 | A1 * | 2/2004 | Gray et al. | 379/67.1 |
| 2004/0059781 | A1 * | 3/2004 | Yoakum et al. | 709/204 |
| 2004/0062383 | A1 * | 4/2004 | Sylvain | 379/265.06 |
| 2004/0122901 | A1 * | 6/2004 | Sylvain | 709/206 |
| 2005/0266859 | A1 * | 12/2005 | Tejani et al. | 455/456.4 |
| 2006/0146790 | A1 * | 7/2006 | Caballero-McCann et al. | 370/352 |
| 2007/0167170 | A1 * | 7/2007 | Fitchett et al. | 455/456.1 |
| 2010/0144345 | A1 * | 6/2010 | Darrow et al. | 455/434 |
| 2010/0211604 | A1 * | 8/2010 | Campbell et al. | 707/780 |
| 2010/0318615 | A1 * | 12/2010 | Griffin | 709/206 |
| 2011/0200179 | A1 * | 8/2011 | Moore et al. | 379/88.01 |
| 2013/0072153 | A1 * | 3/2013 | Lawson et al. | 455/410 |

* cited by examiner

*Primary Examiner* — Binh Tieu
(74) *Attorney, Agent, or Firm* — Meyer IP Law Group

(57) ABSTRACT

A system and method can support a virtual private network based on a public telecommunication infrastructure. The virtual private network can receive a request from a caller for place a call to a callee via the virtual private network. The virtual private network can obtain at least one of presence status and location information of the callee. Then, the virtual private network can allow the caller to make a decision on whether or not to proceed with the call. The public telecommunication infrastructure can be based on a legacy network and an Internet Protocol Multimedia Subsystem (IMS) network, and the virtual private network can obtain information from both the legacy network and the IMS network via a service broker.

20 Claims, 3 Drawing Sheets

SYSTEM AND METHOD FOR ALLOWING VIRTUAL PRIVATE NETWORK USERS TO OBTAIN PRESENCE STATUS AND/OR LOCATION OF OTHERS ON DEMAND

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to telecommunication network, and is particularly related to supporting a virtual private network (VPN).

BACKGROUND

Internet Protocol (IP) Multimedia Subsystem (IMS) is the convergence of fixed, mobile and Internet communications traffic on one IP network. IMS allows communication service providers to launch content and integrated multimedia services, e.g., messaging with voice and video, much more quickly. IMS enables communication service providers to implement more agile, flexible and cost-effective information technology (IT) infrastructures that can easily evolve with next-generation network architectures.

These are the general areas that embodiments of the invention are intended to address.

SUMMARY

Described herein are systems and methods for supporting a virtual private network based on a public telecommunication infrastructure. The virtual private network can receive a request from a caller to place a call to a callee via the virtual private network. The virtual private network can obtain at least one of presence status and location information of the callee. Then, the virtual private network can allow the caller to make a decision on whether or not to proceed with the call. The public telecommunication infrastructure can be based on a legacy network and an Internet Protocol Multimedia Subsystem (IMS) network, and the virtual private network (VPN) can obtain information from both the legacy network and the IMS network via a service broker.

DETAILED DESCRIPTION

Described herein are systems and methods for supporting a virtual private network (VPN) based on a public telecommunication infrastructure.

A VPN is a communication network that can be based on public telecommunication infrastructure, such as the Internet. The VPN network can provide access to a central organizational network for remote offices or traveling users. The VPN network allows remote users of the network to be authenticated, and uses secure data with encryption technologies to prevent disclosure of private information to unauthorized parties. The VPN network can serve different network functionalities, such as sharing data and providing access to the network resources, printers, databases, websites, etc. A VPN user can access the central network in a manner that is identical or similar to being connected directly to the central network. The VPN technology can take advantage of the public internet, instead of relying on dedicated leased-line telecommunication circuits in wide-area network (WAN) installations. Thus, the VPN technology can reduce costs by avoiding the need to acquire and maintain expensive physical leased lines in order to connect remote users to a central network.

Figure 1:
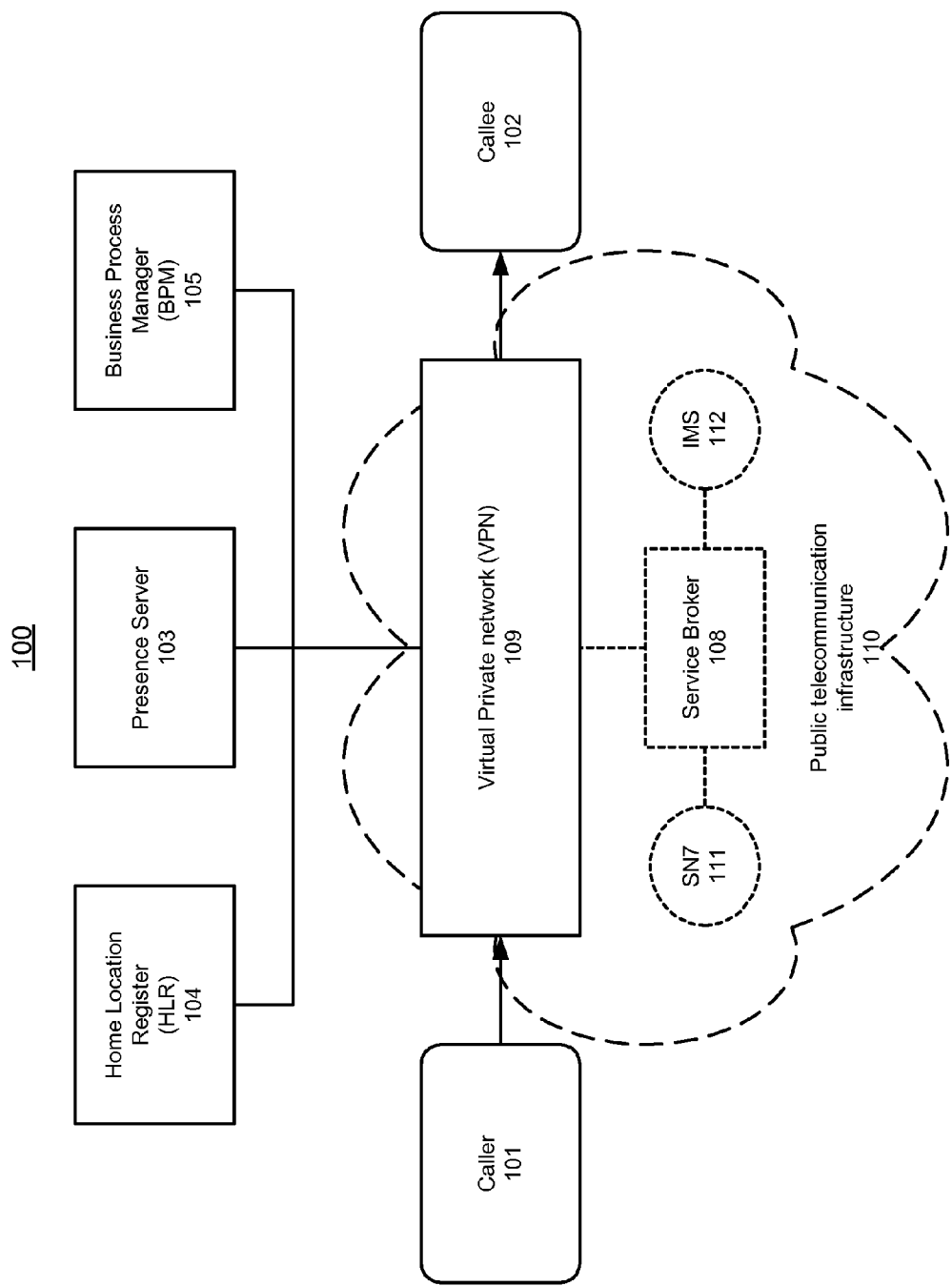
FIG. 1 shows an illustration of a telecommunication network environment that supports a virtual private network (VPN), in accordance with an embodiment of the invention.

FIG. 1 shows an illustration of a telecommunication network environment 100 that supports a VPN, in accordance with an embodiment of the invention. As shown in FIG. 1, a caller 101 can communicate with a callee 102 via a VPN 109, which can be based on a public telecommunication infrastructure 110.

The VPN 109 allows a caller 101, or a remote user, to input a telephone number of a callee 102, or a contact, which is connected directly or remotely, into a computer. The VPN 109, or a remote user of the VPN, is able to know the status of different contacts sharing the central organizational network, such as whether those contacts are connected directly to the central network or are also connected by a VPN.

The caller 101 can input or dial a telephone number of the callee 102, e.g. via terminal equipment. Then, the caller 101 can press a specific button on the terminal equipment to send the telephone number of the callee 102 to the VPN 109. The VPN 109 can accept the number from the terminal equipment and performs a number translation, e.g. using a phone book service (PBS). The VPN 109 can perform number translation for different purposes. For example, the VPN 109 can translate a short number used in a local network into a long number that may include different regional codes.

Furthermore, the VPN 109 can query a presence server 103 in order to obtain the presence information, and can provide the caller 101, or the remote user, with the availability of the callee 102, or a contact identified with the telephone number. The VPN 109 can also query a home location register (HLR) 104 in order to obtain the location of the identified person, e.g. via a Map Anytime Interrogation (ATI) message. Additionally, the system can also send information to a business process manager (BPM) 105, e.g. a billing and revenue manager (BRM), to view billing information and/or charging information prior to proceeding with the telephone call or data exchange session.

The above information can then be sent to the terminal on the caller 101 side, which allows the caller 101, or the remote user, to decide whether or not the communication should proceed, when the callee 102, or the contact identified by the phone number, is available.

Additionally, the VPN 109 can enforce call restrictions based on the information obtained both from the caller 101 and the callee 102. For example, the VPN 109 allows for establishing different profiles based on various policy configurations. Furthermore, the VPN 109 can prevent a caller 101 from calling a callee 102 at certain location or time, as indicated by the obtained presence status and location information of the caller 102.

In accordance with an embodiment of the invention, a public telecommunication infrastructure 110 can use different types of telecommunication technologies, such as an IMS network 112 and/or a legacy network (e.g., a SN7 network 111). The IMS network is capable of providing wide ranges of information, such as presence information, in addition to the type of formation that is capable of being provided by a legacy network 111. The VPN 109 allows the information to be shared among users of networks based on different technologies, e.g. via a service broker 108. For example, a caller 101, who is based on the SN7 network 111, can be provided with the presence information of a callee 102, who is based on a IMS network.

Figure 2:
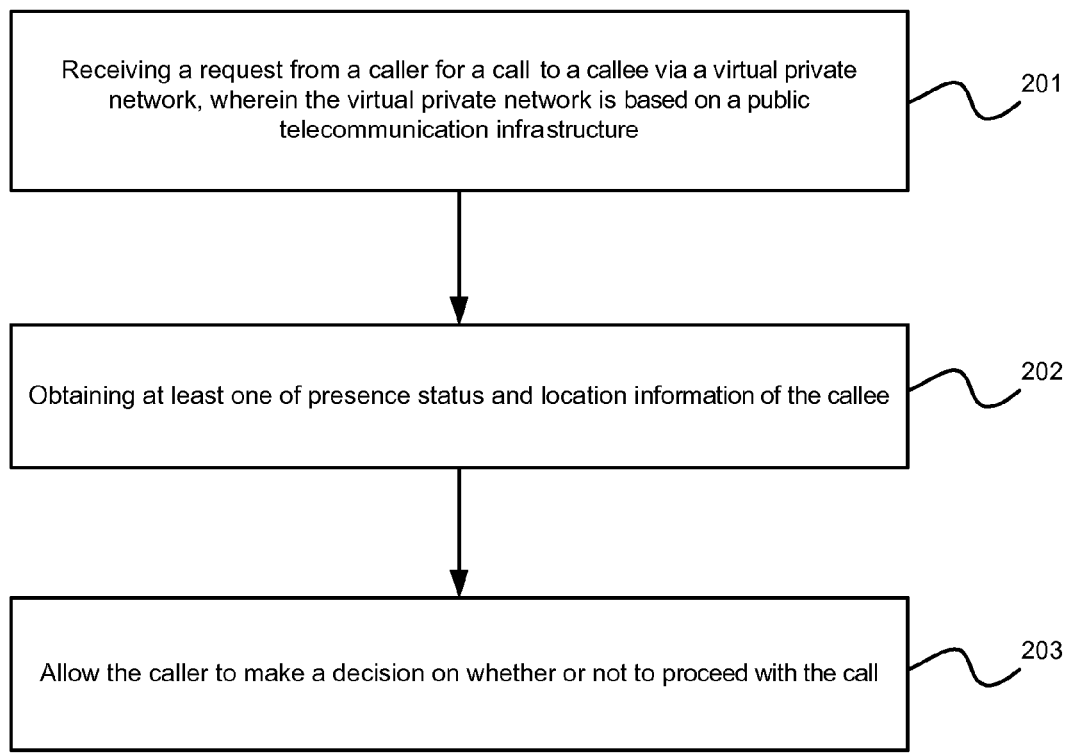
FIG. 2 illustrates an exemplary flow chart for supporting a VPN in a telecommunication network environment, in accordance with an embodiment of the invention.

FIG. 2 illustrates an exemplary flow chart for supporting a VPN in a telecommunication network environment, in accordance with an embodiment of the invention. As shown in FIG. 2, at step 201, a VPN can receive a request from a caller for a call to a callee, wherein the VPN can be based on a public telecommunication infrastructure. Then, at step 202, the VPN can obtain at least one of presence status and location information of the callee. Finally, at step 203, the VPN allows the caller to make a decision on whether or not to proceed with the call.

An Exemplary Use Case

Figure 3:
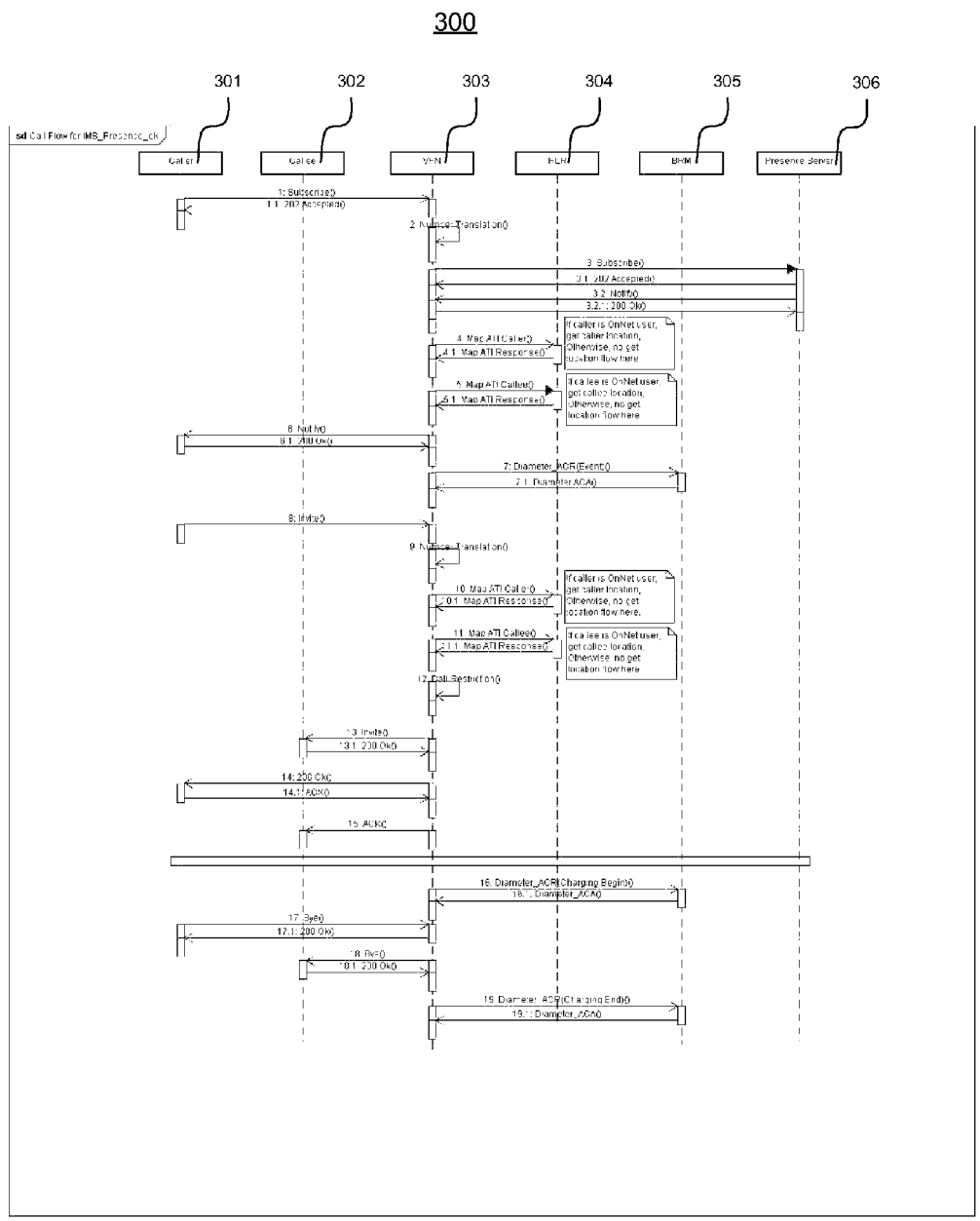
FIG. 3 shows an illustration of an exemplary use case for establishing communication via a VPN, in accordance with an embodiment of the invention.

FIG. 3 shows an illustration of an exemplary use case for establishing communication via a VPN, in accordance with an embodiment of the invention. As shown in FIG. 3, a caller 301 can trigger a subscribe message by pressing a button on terminal equipment (step 1), in order to initiate a communication with a callee 302. Then, the VPN 303 can send a response to the caller 301 and perform number translation (steps 1.1 & 2). Furthermore, the VPN 303 can query a presence server 306 for the presence information (steps 3, 3.1, 3.2, & 3.2.1). Optionally, the VPN 303 can be configured to a query home location register (HLR) 304 for the location information (steps 4, 4.1, 5, & 5.1), e.g. when the caller is an OnNet user.

Then, the VPN 303 can send a notification message with presence information and/or location information of the callee 302 to the terminal on the caller side, so that the information can be shown on the terminal (steps 6 & 6.1). Optionally, the VPN 303 can be configured to obtain charging information from the billing system, e.g. a BRM 305 (steps 7 & 7.1).

Thus, based on the received presence information and/or location information of the callee 302, the caller 301 can make a decision on whether or not to continue the communication with the callee 302. The VPN 303 allows the caller 301 to terminate the communication if the user does not want to continue the call, e.g. when the callee 302 is in a meeting or busy, in which case the presence status of the callee 202 is set to not take the call.

Furthermore, if the caller decides to continue the phone call, the caller 301 can send an invitation message to the VPN 303 (step 8), which can perform the number translation (step 9). Then, the VPN 303 can query home location register (HLR) 304 for the updated location information (steps 10, 10.1, 11, & 11.1), if applicable. In addition, the VPN 303 can perform call restrictions based on the information obtained from both the caller 301 and the callee 302 (step 12).

Once the VPN 203 allows the communication between the caller 301 and the callee 302 to proceed, the VPN 203 can send an invitation message to the callee 302, which can choose to accept the call (steps 13 & 13.1). Then, the VPN 303 can establish the communication between the caller 301 and the callee 302 (steps 14, 14.1, & 15). At the mean time, the VPN 303 can notify the billing system 305 to begin charging (steps 16 & 16.1). Finally, the VPN 303 can terminate the communication and stop charging, when the caller 301 and the callee 302 are done with the phone call or the data exchange session (steps 17, 17.1, 18, 18.1, 19. & 19.1).

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for supporting virtual private networking operating on one or more microprocessors, comprising:
   receiving a request from a caller for a call to a callee via a virtual private network (VPN), wherein the VPN is based on a public telecommunication infrastructure;
   wherein the caller is connected to the VPN;
   obtaining at least one of presence status and location information of the callee, wherein said presence status and location information indicates whether said callee is connected to the VPN or is connected directly to a central network; and
   allowing the caller to make a decision on whether or not to proceed with the call.

2. The method of claim 1, further comprising:
   receiving a subscribe message from the caller, wherein the caller can trigger the subscribe message by pressing a button on a terminal equipment.

3. The method of claim 1, further comprising:
   translating a first number in the request into a second number.

4. The method of claim 1, further comprising:
   allowing the virtual private network to access a presence server to obtain the presence status of the callee.

5. The method of claim 1, further comprising:
   allowing the virtual private network to access a home location register to obtain the location information of the callee.

6. The method of claim 1, further comprising:
allowing the virtual private network to access a business process manager to obtain billing information and/or charging information prior to connecting the call.

7. The method of claim 1, further comprising:
sending a notification message with at least one of presence status and location information of the callee to the caller.

8. The method of claim 1, further comprising:
allowing the public telecommunication infrastructure to be based on both a legacy network and an Internet Protocol Multimedia Subsystem (IMS) network.

9. The method of claim 8, further comprising:
allowing the virtual private network to obtain information from both the legacy network and the IMS network via a service broker.

10. The method of claim 1, further comprising:
connecting to the callee if the caller decide to proceed with the call.

11. A non-transitory machine readable storage medium having instructions stored thereon that when executed cause a system to perform the steps comprising:
receiving a request from a caller for a call to a callee via a virtual private network, wherein the virtual private network is based on a public telecommunication infrastructure, and wherein the caller is connected to the VPN;
obtaining at least one of presence status and location information of the callee, wherein said presence status and location information indicates whether said callee is connected to the VPN or is connected directly to a central network; and
allowing the caller to make a decision on whether or not to proceed with the call.

12. The non-transitory machine readable storage medium of claim 11, further having instructions stored thereon that when executed cause a system to perform the step of:
receiving a subscribe message from the caller, wherein the caller can trigger the subscribe message by pressing a button on a terminal equipment.

13. The non-transitory machine readable storage medium of claim 11, further having instructions stored thereon that when executed cause a system to perform the step of:
translating a first number in the request into a second number.

14. The non-transitory machine readable storage medium of claim 11, further having instructions stored thereon that when executed cause a system to perform the step of:
allowing the virtual private network to access a presence server to obtain the presence status of the callee.

15. The non-transitory machine readable storage medium of claim 11, further having instructions stored thereon that when executed cause a system to perform the step of:
allowing the virtual private network to access a home location register to obtain the location information of the callee.

16. The non-transitory machine readable storage medium of claim 11, further having instructions stored thereon that when executed cause a system to perform the step of:
allowing the virtual private network to access a business process manager to obtain billing information and/or charging information prior to connecting the call.

17. The non-transitory machine readable storage medium of claim 11, further having instructions stored thereon that when executed cause a system to perform the step of:
sending a notification message with at least one of presence status and location information of the callee to the caller.

18. The non-transitory machine readable storage medium of claim 11, further having instructions stored thereon that when executed cause a system to perform the steps of:
allowing the public telecommunication infrastructure to be based on both a legacy network and an IMS network; and
allowing the virtual private network to obtain information from both the legacy network and the IMS network via a service broker.

19. The non-transitory machine readable storage medium of claim 11, further having instructions stored thereon that when executed cause a system to perform the step of:
connecting to the callee if the caller decide to proceed with the call.

20. A system for supporting virtual private networking, comprising:
one or more microprocessors;
a virtual private network based on a public telecommunication infrastructure running on the one or more microprocessors, wherein the virtual private network operates to perform the steps of:
receiving a request from a caller for a call to a callee via a virtual private network, wherein the virtual private network is based on a public telecommunication infrastructure, wherein the caller is connected to the VPN;
obtaining at least one of presence status and location information of the callee, wherein said presence status and location information indicates whether said callee is connected to the VPN or is connected directly to a central network; and
allowing the caller to make a decision on whether or not to proceed with the call.

* * * * *

UNITED STATES PATENT AND TRADEMARK OFFICE
CERTIFICATE OF CORRECTION

| | | |
|---|---|---|
| PATENT NO. | : 8,804,928 B2 | Page 1 of 1 |
| APPLICATION NO. | : 13/655717 | |
| DATED | : August 12, 2014 | |
| INVENTOR(S) | : Si et al. | |

It is certified that error appears in the above-identified patent and that said Letters Patent is hereby corrected as shown below:

On the title page item [57], line 3, delete "for" and insert -- to --, therefor.

Signed and Sealed this
Twenty-second Day of September, 2015

Michelle K. Lee
*Director of the United States Patent and Trademark Office*